United States Patent [19]

Sugiyama

[11] Patent Number: 4,477,839

[45] Date of Patent: Oct. 16, 1984

[54] COLOR VIDEO SIGNAL REPRODUCING APPARATUS

[75] Inventor: Hiroyuki Sugiyama, Isehara, Japan

[73] Assignee: Victor Company of Japan, Ltd., Yokohama, Japan

[21] Appl. No.: 341,637

[22] Filed: Jan. 22, 1982

[30] Foreign Application Priority Data

Jan. 26, 1981 [JP] Japan ................................ 56-9921

[51] Int. Cl.³ ............................................. H04N 5/76
[52] U.S. Cl. ................................................. 358/326
[58] Field of Search ................. 358/11, 321, 323, 324, 358/315, 318, 322, 24, 326; 360/36.1

[56] References Cited

U.S. PATENT DOCUMENTS

| | | | |
|---|---|---|---|
| 4,137,547 | 1/1979 | Yamamitsu | 358/326 |
| 4,204,220 | 5/1980 | Rutishauser | 358/324 |
| 4,208,674 | 6/1980 | Kuniyoshi et al. | 358/326 |
| 4,277,795 | 7/1981 | Rehfeldt | 358/18 |
| 4,283,738 | 8/1981 | Rutishauser | 358/11 |

FOREIGN PATENT DOCUMENTS

| | | |
|---|---|---|
| 2543652 | 7/1977 | Fed. Rep. of Germany . |
| 1425273 | 2/1976 | United Kingdom . |
| 1467843 | 3/1977 | United Kingdom . |
| 2004712 | 4/1979 | United Kingdom ............... 358/338 |
| 1582984 | 1/1981 | United Kingdom . |

*Primary Examiner*—John C. Martin
*Assistant Examiner*—E. A. McDowell
*Attorney, Agent, or Firm*—Louis Bernat

[57] ABSTRACT

A color video signal reproducing apparatus responds to either PAL or SECAM signals by separating a carrier chrominance signal and a luminance signal from a color video signal which is reproduced from a recording medium. The separated carrier chrominance signal is demodulated into two color difference signals. An oscillator supplies a predetermined frequency signal to the demodulators. The output frequency of the oscillator is controlled in response to a jitter component in the carrier chrominance signal. The phases of a reference signal and of a horizontal synchronizing signal are compared to produce a reference signal which is phase shifted by 180 degrees. A switching circuit operates every one horizontal scanning period in response to the reference signal. A modulating circuit responds to the reference signal and to a signal from the switching circuit by modulating them with the color difference signal. The output color video signal is produced in response thereto.

6 Claims, 2 Drawing Figures

COLOR VIDEO SIGNAL REPRODUCING APPARATUS

BACKGROUND OF THE INVENTION

The present invention generally relates to color video signal reproducing apparatuses, and more particularly to a color video signal reproducing apparatus which supplies a PAL system or SECAM system color video signal reproduced from a recording medium to a PAL system or SECAM system television receiver, after eliminating fluctuations in the phase and level of a carrier chrominance signal due to time-base fluctuation such as jitter included in the PAL system or SECAM system color video signal. In the present specification and claims, a reproduced PAL system color video signal refers to a signal obtained by reproducing a PAL system color video signal which is recorded onto a recording medium, and in addition, also includes a signal obtained by reproducing an NTSC system color video signal which is recorded onto a recording medium, as an artificial PAL system color video signal.

Generally, in a reproducing apparatus for reproducing a rotary recording medium (hereinafter simply referred to as a disc) on which a color video signal is recorded, due to such causes as irregular rotation of the disc, eccentricity of the disc, and curves formed in the recording surface of the disc, a time-base fluctuation component (hereinafter referred to as jitter) is included within the reproduced color video signal. Accordingly, in the conventional disc reproducing apparatus, a circuit is provided for compensating for the above jitter. This circuit separates a horizontal synchronizing signal from the reproduced color video signal, compares the phases of the separated horizontal synchronizing signal and an output signal of a crystal oscillator, and compensates for the jitter by use of an output error signal obtained as a result of the phase comparison.

However, the jitter within the reproduced color video signal could not be sufficiently compensated, by use of the jitter compensation circuit alone, in the above conventional reproducing apparatus. There was a disadvantage in that some jitter still remained within the reproduced color video signal after performing jitter compensation by the above jitter compensation circuit. On the other hand, generally, an automatic phase compensation circuit (APC circuit), an automatic chrominance control circuit (ACC circuit), and the like are provided in a television receiver. However, the television receiver is generally designed to receive broadcast signals having no jitter and displays a received image on the screen, and measures are not taken with respect to signals having jitter. Hence, when the reproduced signal in which some jitter still remains as described above, is supplied as it is to the television receiver, the hue and color saturations of the reproduced color picture varies according to the performance of the APC circuit and the ACC circuit which differ according to the manufacturer of the television receiver. Therefore, there was a disadvantage in that a reproduced color picture having a regular and stable picture quality could not be obtained.

SUMMARY OF THE INVENTION

Accordingly, it is a general object of the present invention to provide a novel and useful color video signal reproducing apparatus in which the above described disadvantages have been overcome.

Another and more specific object of the present invention is to provide a color video signal reproducing apparatus capable of effectively and positively eliminating a jitter component within a color video signal reproduced from a recording medium. The color video signal reproducing apparatus according to the present invention is provided with a chrominance signal demodulating circuit and a chrominance signal modulating circuit including an APC circuit, and a circuit for supplying a chrominance subcarrier to the chrominance signal modulating circuit, in addition to jitter compensation means which is conventionally provided. The above circuit for supplying the chrominance subcarrier to the chrominance signal modulating circuit consists of a crystal oscillator, a phase shifter for shifting an output signal of the crystal oscillator by 180 degrees, and a switching circuit for switching the outputs of the crystal oscillator and the phase shifter for every one horizontal scanning period. This switching circuit performs a switching operation according to a horizontal scanning frequency signal having the same jitter as the jitter component present in the reproduced color video signal.

Other objects and further features of the present invention will be apparent from the following detailed description when read in conjunction with the accompanying drawings.

DETAILED DESCRIPTION

Figure 1:
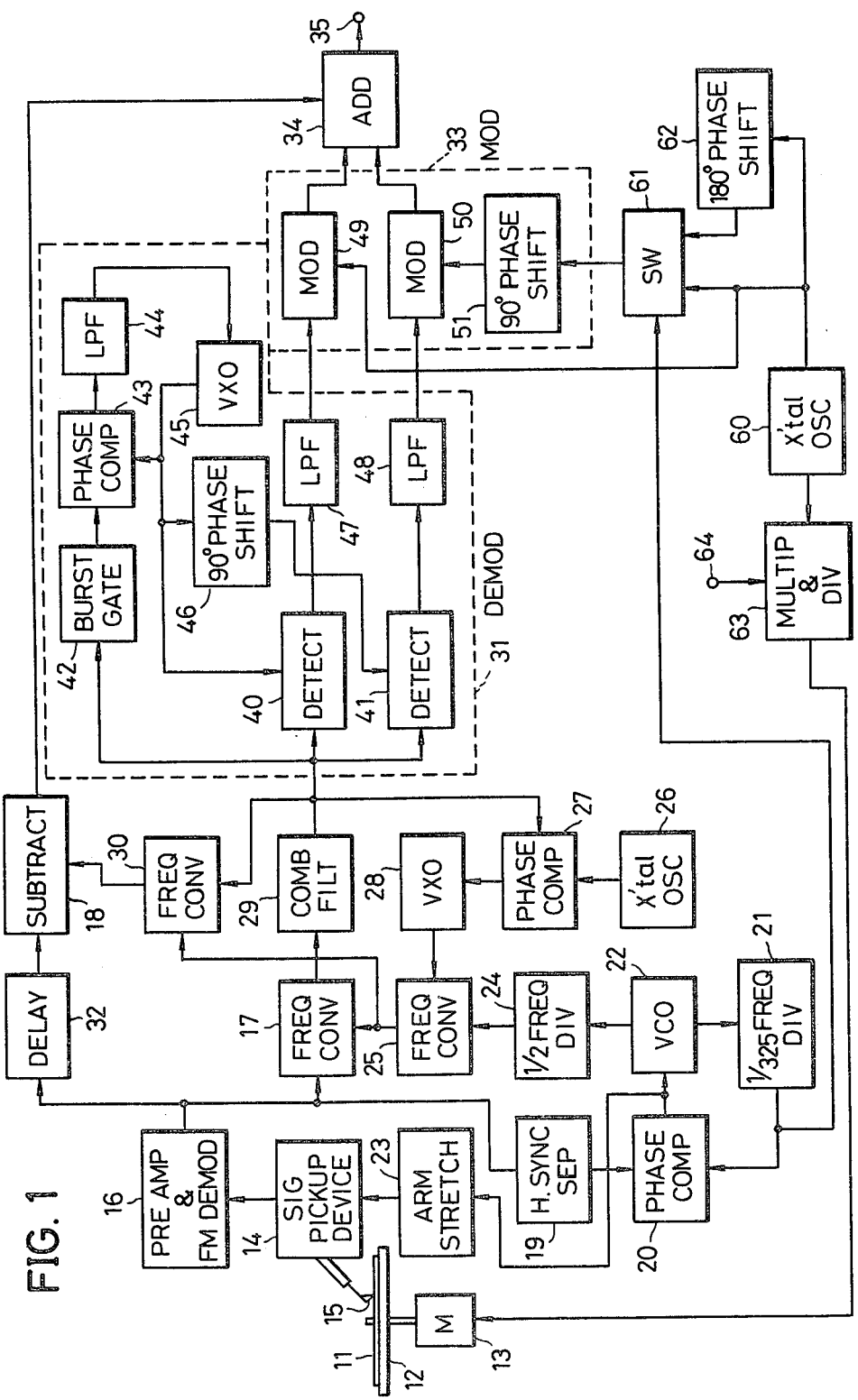
FIG. 1 is a systematic block diagram showing a first embodiment of a color video signal reproducing apparatus according to the present invention.

In FIG. 1, a disc 11 on which a color video signal is recorded as variations in geometrical configuration, is placed onto a turntable 12. The disc 11 is rotated at a predetermined rotational speed by a motor 13, together with the turntable 12. In a case where the disc 11 is recorded with a PAL system color video signal, the motor 13 is rotated at a rotational speed of 750 rpm. On the other hand, when the disc 11 is recorded with an NTSC system color video signal, the motor 13 is rotated at a rotational speed of 892.85712 rpm. Since the motor 13 is rotated at the above described rotational speed, a horizontal scanning frequency $f_H$ of the reproduced NTSC system color video signal becomes equal to a horizontal scanning frequency of 15.625 kHz of the PAL system color video signal. Accordingly, the reproduced NTSC system color video signal is processed as an artificial PAL system color video signal.

The color video signal recorded on the disc 11 is picked up by a reproducing stylus 15 of a signal pickup device 14, according to variations in electrostatic capacitance between the disc 11 and the reproducing stylus 15. The signal thus picked up by the signal pickup device 14 is supplied to a circuit 16 consisting of a preamplifier and an FM-demodulating circuit, wherein the signal is demodulated. An output color video signal of the above circuit 16 is supplied to a frequency converter 17, a subtraction circuit 18, and a horizontal synchronizing signal separation circuit 19. The above color video signal is, for example, a signal obtained by multiplexing a luminance signal having a band of zero to approximately 3 MHz and a carrier chrominance signal having a band of 2.56 MHz±500 kHz, within a common band.

A horizontal synchronizing signal (the frequency $f_H$ of the horizontal synchronizing signal is 15.625 kHz) separated at the horizontal signal separation circuit 19 is supplied to a phase comparator 20. The phase comparator 20 compares the phases of the above separated horizontal synchronizing signal and a signal obtained from a 1/325-frequency divider 21 having a frequency $f_H$. An output error voltage of the phase comparator 20 is supplied to a voltage controlled oscillator (VCO) 22, to control the oscillation frequency of the VCO 22. The output oscillation frequency of the VCO 22 is 325 $f_H$. An output of the VCO 22 is supplied to the 1/325-frequency divider 21 and a ½-frequency divider 24. The above phase comparator 20, the VCO 22, and the frequency divider 21 construct a phase locked loop (PLL) circuit in order to control the oscillation frequency of the VCO 22 so that a jitter component within the color video signal is relatively eliminated.

The output of the phase comparator 20 is also applied to an arm stretcher (a jitter compensation mechanism, not shown) of the signal pickup device, through an arm stretcher circuit 23. The position of the reproducing stylus 15 along the relative scanning direction with respect to the disc 11 is corrected by the above mechanism, to perform the jitter compensation mechanically.

The output signal of the VCO 22 having the frequency of 325 $f_H$, is supplied to the ½-frequency divider 24 wherein the frequency is frequency-divided into a frequency of 325/2 $f_H$. This signal having the frequency of 325/2 $f_H$ is supplied to a frequency converter 25. A signal from the frequency divider 24 is frequency-converted at the frequency converter 25, by a signal obtained from a voltage controlled type crystal oscillator (VXO) 28 having a frequency of 4.43 MHz. Accordingly, the signal from the frequency divider 24 is frequency-converted into a signal having a frequency of 6.99 MHz. An output signal of the frequency converter 25 is supplied to frequency converters 17 and 30.

The color video signal (having a carrier chrominance signal having a frequency of 2.56 MHz) including the jitter component, which is obtained from the circuit 16, is frequency-converted into a signal having a frequency of 4.43 MHz by a signal (having a frequency of 6.99 MHz) from the frequency converter 25, at the frequency converter 17. The output signal of the frequency converter 17 is supplied to a comb filter 29. A carrier chrominance signal having a frequency of 4.43 MHz which is obtained at the above comb filter 29, is supplied to a chrominance signal demodulating circuit 31, a phase comparator 27, and the frequency converter 30.

The phase comparator 27 compares the phases of the carrier chrominance signal from the above comb filter 29 having the frequency of 4.43 MHz, and a reference signal supplied from a crystal oscillator 26 which has a frequency of 4.43 MHz. An output error voltage of the phase comparator is applied to the VXO 28, to control the oscillation frequency of the VXO 28. Accordingly, the oscillation frequency of the VXO 28 fluctuates according to the jitter component present in the carrier chrominance signal which is obtained from the comb filter 29. A closed loop consisting of the frequency converters 17 and 25, the comb filter 29, the phase comparator 27, and the VXO 28 constructs an automatic phase compensation (APC) circuit. Thus, compensation is performed by the above described arm stretcher and the PLL circuit, to compensate relatively for the remaining jitter component. An oscillation frequency $f_{sc}$ of the crystal oscillator 26 can be described by an equation $f_{sc} = N/2 \cdot f_H$, where N is an odd integer. In the present embodiment of the invention, the frequency $f_{sc}$ is selected to approximately 4.43 MHz.

The carrier chrominance signal obtained from the comb filter 29, having the frequency of 4.43 MHz, is frequency-converted by a signal from the frequency converter 25 having the frequency of 6.99 MHz and a time-base which fluctuates according to the jitter component, at the frequency converter 30. The carrier chrominance signal including the jitter component and having the frequency of 2.56 MHz, is supplied to the subtraction circuit 18 from the frequency converter 30. The color video signal including the jitter component is supplied to the subtraction circuit 18 through a delay circuit 32 for matching the timing. Hence, the carrier chrominance signal is eliminated from the color video signal at the subtraction circuit 18, and only the luminance signal is obtained. The luminance signal thus obtained, is supplied to an adder 34.

The output carrier chrominance signal of the comb filter 29 which is supplied to the chrominance signal demodulating circuit 31, is supplied to detectors 40 and 41, and to a burst gate 42. This carrier chrominance signal is mostly eliminated of the jitter component, however, slight jitter component still remains within the carrier chrominance signal.

A color burst signal extracted at the burst gate 42 is supplied to a phase comparator 43. The phase comparator 43 compares the phases of the signal supplied thereto and the output signal from a VXO 45 having a frequency of 4.43 MHz. An output phase error signal of the phase comparator 45 is applied to the VXO 45 through a lowpass filter 44, to control the oscillation frequency of the VXO 45. In addition to being supplied to the phase comparator 43, the output signal of the VXO 45 is also supplied directly to the detector 40, and to the detector 41 through a 90°-phase shifter 46. Accordingly, color difference signals from which the jitter component is completely compensated, are obtained from the above detectors 40 and 41. These color difference signals are respectively supplied to modulators 49 and 50 of a modulating circuit 33, through lowpass filters 47 and 48.

The filtering band of the above lowpass filter 44 is selected so as to sufficiently pass the jitter component. In a case where the disc 11 is rotated at a rotational speed of 900 rpm, for example, the jitter frequency is 15 Hz. Thus, in this case, the upper limit frequency of the filtering band of the lowpass filter 44 is selected in the range of 60 Hz, for example, so that the signal having this frequency of 15 Hz is sufficiently passed.

An output signal (having a frequency of 4.43361875 MHz) of a crystal oscillator 60 is directly supplied to the modulator 49. Moreover, the output signal of the crystal oscillator 60 is supplied to a switching circuit 61 on one hand, and supplied to the switching circuit 61 after being phase-shifted by 180 degrees at a 180°-phase shifter 62.

The above switching circuit 61 is supplied with the output signal (having the frequency $f_H$ equal to 15.625 kHz) of the 1/325-frequency divider 21, and performs a switching operation for every one horizontal scanning period (1H). Hence, the switching circuit 61 alternately switches the signals from the crystal oscillator 60 and the 180°-phase shifter 62 for every 1H, and supplies the switched signal to the modulator 50.

The modulators 49 and 50 respectively modulate the chrominance sub carrier from the crystal oscillator 60 and the switching circuit 61, by the color difference signals from the demodulating circuit 31. A rectangular two-phase modulated signal obtained from the modulating circuit 33 is supplied to the adder 34, and added with the luminance signal from the subtracting circuit 18. The reproduced PAL system (or artificial PAL system) color video signal thus obtained from the adder 34 is supplied to a PAL system color television receiver through an output terminal 35.

On the other hand, the output signal of the crystal oscillator 60 is supplied to a circuit 63 consisting of a frequency multiplier and a frequency divider. In a case where the disc 11 being reproduced is recorded with the NTSC system color video signal, a signal is applied to a terminal 64. When the signal is not applied to the terminal 64, that is, in the case where the disc 11 being reproduced is recorded with the PAL system color video signal, the motor 13 is rotated at the rotational speed of 750 rpm by an output of the circuit 63. On the other hand, the frequency-multiplying ratio and the frequency-dividing ratio of the above circuit 63 is switched over according to the signal applied to the terminal 64. Accordingly, when the disc 11 is recorded with the NTSC system color video signal, the motor 13 is rotated at the rotational speed of 892.85712 rpm by the output of the above circuit 63.

Before completing the apparatus according to the present invention, the present inventor has tried to develop an apparatus in which the switching circuit 61 is switched over for every one horizontal scanning period (1H), by a signal obtained by frequency-dividing the output of the crystal oscillator 60 which has a frequency equal to the horizontal scanning frequency. However, in this apparatus, the switching of the phase of the chrominance sub carrier is performed with no relation to the time-base fluctuation component. Accordingly, the carrier chrominance signal thus modulated and obtained becomes nonsynchronous with the luminance signal which includes the time-base fluctuation component. Thus, it was learned that there is a disadvantage in that inconsistency in color is introduced in the reproduced picture of the television receiver. It can hence be understood that the jitter is reduced at the arm stretcher. However, although the so-called jitter compensation is performed in the PLL circuit, the APC circuit, and the like within the reproducing circuit, the oscillation of the variable frequency oscillators within these circuits are controlled according to the jitter. That is, control is performed so that there is no phase shift of the oscillation frequency signal of the variable frequency oscillators, in order to prevent undesirable effects of the jitter to appear in the reproduced picture. Therefore, the color difference signals which have passed through the demodulating circuit including the APC circuit still includes the time-base fluctuation.

Accordingly, in the reproducing apparatus of the present invention, the switching circuit 61 for switching the output signals of the crystal oscillator 60 and the 180°-phase shifter 62, is switched over by the output signal $f_H$ of the 1/325-frequency divider which includes the time-base fluctuation. Hence, the timing with which the switching circuit 61 is switched over coincides with the time-base fluctuation component included within the color difference signals which are supplied to the modulators 49 and 50. Therefore, no inconveniences such as that introduced in the above tested method is introduced.

Phase shifters of an arbitrary angle may be used instead of the 90°-phase shifters 46 and 51. All that is required is that the shifting angles of the phase shifters 46 and 51 are mutually the same.

Although not shown in FIG. 1, an ACC circuit may be provided within the above chrominance signal demodulating circuit 31.

Figure 2:
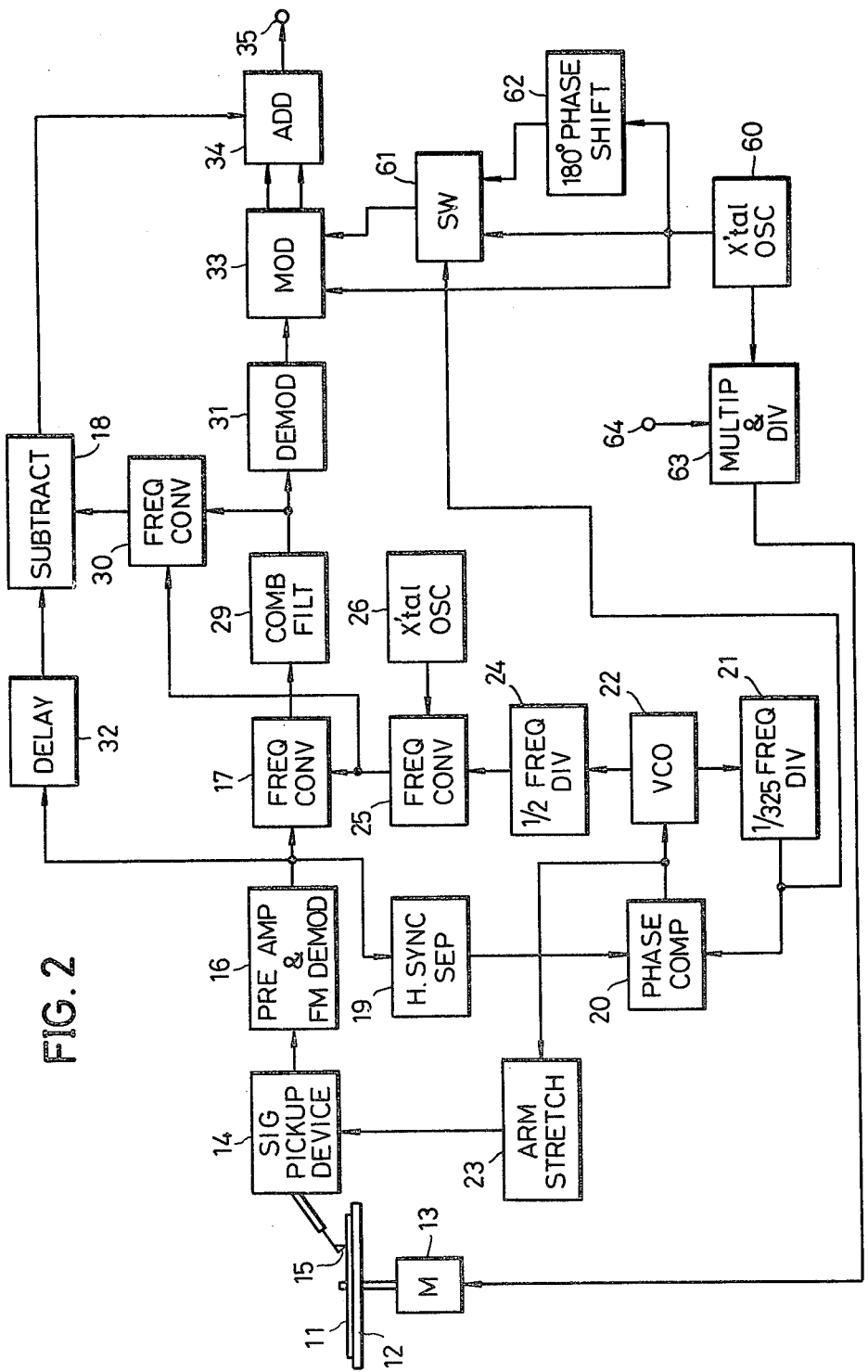
FIG. 2 is a systematic block diagram showing a second embodiment of a color video signal reproducing apparatus according to the present invention.

A second embodiment of a color video signal reproducing apparatus according to the present invention is shown in FIG. 2. In FIG. 2, those parts which are the same as those corresponding parts in FIG. 1 are designated by the same reference numerals, and their description will be omitted. In the present embodiment of the invention, the phase comparator 27 and the VXO 28 provided in the above first embodiment of the invention are omitted. Moreover, the frequency converter 25 is supplied with the output signal of the crystal oscillator 26 having the frequency of 4.43 MHz. According to the present embodiment of the invention, a jitter compensating function is not obtained by the loop including the phase comparator 27, and the VXO 28. However, in a case where the jitter component present in the color video signal which is picked up is small, practically sufficient jitter compensation can be performed by the arm stretcher and the chrominance signal demodulating circuit 31.

In each of the above described embodiments of the present invention, description was given with respect to an apparatus for reproducing a color video signal from a disc. However, the present invention is not limited to the above, and for example, the apparatus may be an apparatus for reproducing a color video signal from a magnetic tape, by use of a similar construction.

Furthermore, in the above described embodiments of the invention, description was given by taking the PAL system color video signal as an example. However, the color video signal may be an NTSC system color video signal. In this case, the switching of lines can be performed in a similar manner, by use of a signal $f_H$ having the horizontal scanning frequency which includes the time-base fluctuation component.

Moreover, in the above described embodiments of the invention, the signal for switching the switching circuit 61 is obtained from the output of the 1/325-frequency divider 21. However, the signal is not limited to the above, and theoretically, the horizontal synchronizing signal separated by the horizontal synchronizing signal separation circuit 19 can be used. However, considering the possible generation of dropouts, it is preferable to use the signal described in the above embodiments of the invention.

Further, the present invention is not limited to these embodiments, but various variations and modifications may be made without departing from the scope of the present invention.

What is claimed is:

1. A color video signal reproducing apparatus comprising:
    reproducing means having a jitter compensation mechanism for reproducing a color video signal from a recording medium;
    frequency converter means responsive to said reproducing means for frequency-converting the color video signal reproduced from said recording medium;

voltage controlled oscillator means;

means responsive to an output of said voltage controlled oscillator for producing a frequency converting signal, said frequency converting signal being supplied to said frequency converter means;

horizontal synchronizing signal separation means responsive to said reproducing means for separating a horizontal synchronizing signal from said reproduced color video signal;

phase comparing means jointly responsive to said horizontal synchronizing signal separation means and to said voltage controlled oscillator means for comparing the phases of said separated horizontal synchronizing signal and the output of said voltage controlled oscillator, said phase comparing means having an output phase error signal which is supplied to said voltage controlled oscillator to control the oscillation frequency thereof, and said output phase error signal being supplied to said jitter compensation mechanism to cause it to perform a jitter compensation;

carrier chrominance signal separation means responsive to said frequency converter means for separating a carrier chrominance signal from said reproduced color video signal;

luminance signal separation means responsive to said reproducing means for separating a luminance signal from said reproduced color video signal;

demodulating circuit means responsive to said carrier chrominance signal separation means for demodulating said color video signal to provide two color difference signals, said demodulating circuit means including an oscillator for supplying a frequency signal to a demodulating means, and a control circuit means for controlling the oscillation frequency of said oscillator in response to a jitter component in said carrier chrominance signal;

reference signal producing means for producing a reference signal having a predetermined frequency;

phase shifting circuit means for shifting the phase of a signal from said reference signal producing means by 180 degrees;

switching circuit means for switching the signals from said reference signal producing means and said phase shifting cirucit means in response to every one horizontal scanning period in the output of the voltage controlled oscillator;

modulating circuit means responsive to said reference signal producing means and said switching circuit means for respectively modulating the reference signal and the signal from said switching circuit means by the color difference signals obtained from said demodulating circuit means; and color video signal obtaining means responsive to said modulating circuit means and to said luminance signal separating means for obtaining a color video signal by adding the output of said modulating circuit and said separated luminance signal.

2. A color video signal reproducing apparatus as claimed in claim 1 in which said frequency converter means comprises a second reference signal producing means for producing a second reference signal of a predetermined frequency, and a second frequency converter means responsive to the voltage controlled oscillator means for frequency converting its output with the output of the second reference signal producing means to produce the frequency converting signal and for supplying said frequency converting signal to the frequency converter means for frequency-converting the color video signal.

3. A color video signal reproducing apparatus as claimed in claim 2 in which said color video signal is either a PAL or SECAM system color video signal, and the frequency of the voltage controlled oscillator means is a frequency of 325 $f_H$, where $f_H$ denotes a horizontal scanning frequency of the color video signal, and first frequency divider means for dividing the output frequency of the voltage controlled oscillator means into a frequency of $f_H$ and for supplying a divided output frequency signal to said phase comparing means and to said switching circuit means, and second frequency divider means for frequency dividing the output frequency of the voltage controlled oscillator means into a frequency of 325/2 $f_H$ and for supplying the divided output frequency signal to said second frequency converter.

4. A color video signal reproducing apparatus as claimed in claim 3 in which the output frequency of the reference signal producing means and the output frequency of the second reference signal producing means are $N/2 \cdot f_H$, where N is an odd integer.

5. A color video signal producing apparatus as claimed in claim 4 in which the frequency $N/2 \cdot f_H$ is 4.43 MHz.

6. A color video signal reproducing apparatus as claimed in claim 1 in which there are two of said demodulator circuit means and the oscillator of said control circuit means is a voltage controlled crystal oscillator; said control circuit means comprising a circuit for extracting a color burst signal from said carrier chrominance signal, phase comparator means for providing an output error signal responsive to a comparison of the phases of an output of said voltage controlled crystal oscillator and of said color burst signal and for applying the resulting output error signal of the phase comparison to control the oscillation frequency of said shifter voltage controlled crystal oscillator, and first phase shifter means for shifting phase of an output signal of said voltage controlled crystal oscillator by 90°; the output of said voltage controlled crystal oscillator being supplied directly to one of the demodulator means and the output of the first phase shifter means being supplied to the other of the two demodulator means; and said modulating circuit means comprises a first modulator means directly supplied with the reference signal from the reference signal producing means and with a signal from said one demodulator means, second phase shifter means for shifting by 90° the phase of an output signal of the switching circuit means, and second modulator means supplied with a signal from said the other demodulator means and with an output signal from said second phase shifter means. pplied with a signal from said the other demodulator means and with an output signal from said second phase shifter means.

* * * * *